United States Patent [19]
Dauliach

[11] Patent Number: 5,910,264
[45] Date of Patent: Jun. 8, 1999

[54] ELECTRICAL COOKING APPARATUS FOR COOKING PRECOOKED, DEEP-FROZEN OR FRESH FOOD, OF THE FRYER TYPE, WITH NO OIL BATH

[76] Inventor: Michel Henri Dauliach, Résidence du Lac de Sault, 03410 Premilhat, France

[21] Appl. No.: 08/765,322

[22] PCT Filed: Jun. 27, 1995

[86] PCT No.: PCT/FR95/00855

§ 371 Date: May 20, 1997

§ 102(e) Date: May 20, 1997

[87] PCT Pub. No.: WO96/01259

PCT Pub. Date: Jan. 18, 1996

[30] Foreign Application Priority Data

Jun. 27, 1994 [FR] France .................................. 94 07866

[51] Int. Cl.⁶ .............................. A47J 37/04; F27D 3/12; F27D 1/18; F27B 7/12
[52] U.S. Cl. .......................... 219/411; 219/392; 219/400; 219/389; 99/443 R; 126/21 A
[58] Field of Search ..................... 219/359, 391, 219/392, 400, 405, 411; 392/418, 422, 423, 425; 99/341, 348, 427, 443 R; 34/63, 601; 126/21 A

[56] References Cited

U.S. PATENT DOCUMENTS

| | | | |
|---|---|---|---|
| 1,993,607 | 3/1935 | Kalgren et al. | 99/427 |
| 4,173,925 | 11/1979 | Leon | 99/348 |
| 4,304,177 | 12/1981 | Loeffler et al. | 99/348 |
| 4,450,758 | 5/1984 | Belinkoff | 99/341 |
| 4,945,212 | 7/1990 | Gogan et al. | 219/405 |
| 4,960,977 | 10/1990 | Alden | 219/411 |
| 5,148,737 | 9/1992 | Poulson | 99/427 |
| 5,182,981 | 2/1993 | Wilcox | 34/63 |
| 5,545,874 | 8/1996 | Hansson | 219/400 |
| 5,676,870 | 10/1997 | Wassman et al. | 219/400 |

FOREIGN PATENT DOCUMENTS

| | | |
|---|---|---|
| 2452906 | 12/1980 | France . |
| 2682009 | 4/1993 | France . |
| 3519964 | 12/1986 | Germany . |
| 93/18349 | 9/1993 | WIPO . |
| 93/21809 | 11/1993 | WIPO . |

*Primary Examiner*—Teresa Walberg
*Assistant Examiner*—J. Pelham
*Attorney, Agent, or Firm*—Sughrue, Mion, Zinn, Macpeak & Seas, PLLC

[57] ABSTRACT

The invention relates to a household electric cooking apparatus, of the frying type, without oil bath, intended to cook frozen or fresh food products such as french fries, etc, without unpleasant smell, without smoke and in a dietetic way. It is comprised of a body which contains a metal housing (2). The cooking is performed by short wavelength infrared radiations. Inside said housing, a removable basket (12) made of perforated metal, rotating upon itself, is driven by an electric motor (13). Between the inner housing (2) and the resistors (11), is provided a removable reflector (14) to facilitate the cleaning of the frying unit. The apparatus is light, has reduced dimensions and cooks very rapidly food lproducts without the risks and disavantages related to the manipulation of boiling oil.

15 Claims, 5 Drawing Sheets

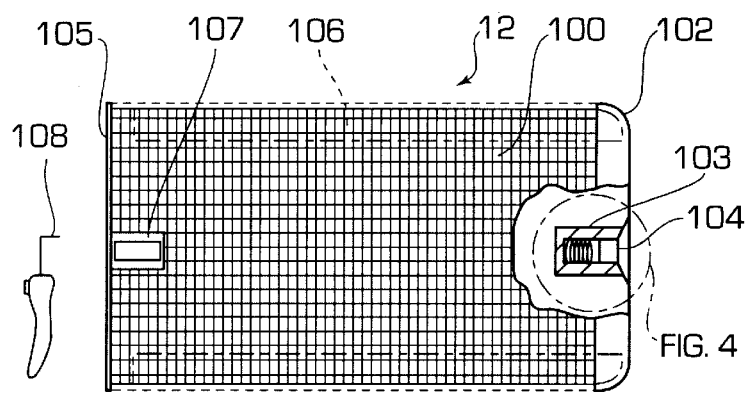
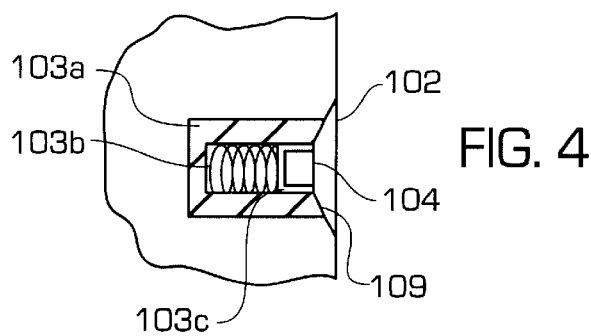
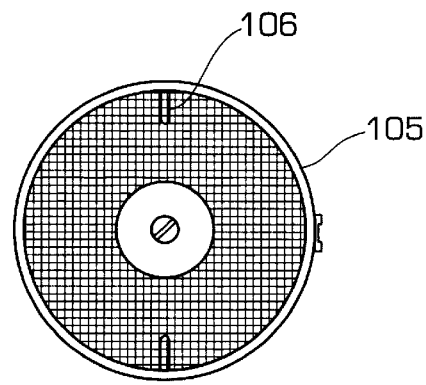
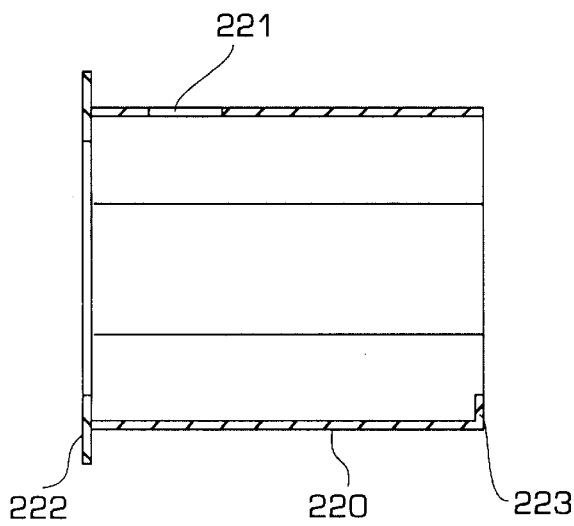
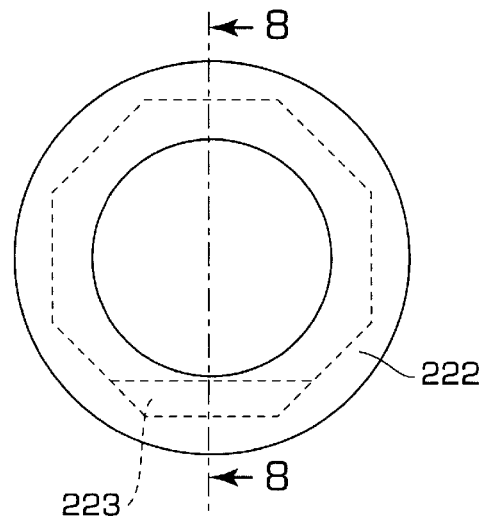

ELECTRICAL COOKING APPARATUS FOR COOKING PRECOOKED, DEEP-FROZEN OR FRESH FOOD, OF THE FRYER TYPE, WITH NO OIL BATH

BACKGROUND OF THE INVENTION

The present invention relates to a domestic electrical cooking apparatus, of the fryer type, with no oil bath, emitting no unpleasant smells or fumes, intended more particularly to be used by the general public.

The use of conventional fryers with an oil bath has such a multitude of drawbacks (unpleasant smell of frying which spreads, as everyone knows, everywhere into rooms and takes a long time to dissipate, difficult digestion associated with the large amount of oil which is absorbed by the food and is often degraded because it is too old, constricted cleaning of the fryer, difficulty of stowing it away because of the presence of the oil bath, etc.), as well as risks in using it (fear of frying-oil spillages, fire, burns, etc.), without taking into account that, in order to obtain satisfactory quality of the fried food, it is necessary to change the oil bath frequently, which significantly increases the cost of the products. All this means that most of the general public hesitates to use the currently commercialized apparatuses on the market.

The result of a study of the general public tends to demonstrate today that the consumption of chips has fallen enormously solely because of unpleasant occurrences caused by the use of a bath of boiling oil.

SUMMARY OF THE INVENTION

The apparatus according to the invention makes it possible, because of no longer using an oil bath, to remedy completely all these drawbacks and all these risks, while at the same time offering a more digestible product since the food is no longer plunged into any fat. This is because the thin film of oil remaining on the surface of commercial deep-frozen food products is sufficient itself to give, after cooking by infrared radiation, a golden appearance and a crunchy consistency while maintaining a soft texture inside the food.

In the case of uncooked food, a controlled oil spray system makes it possible to obtain the same result as above.

The invention therefore relates to a household electrical cooking apparatus, not requiring preheating, with forced or nonforced extracted-air circulation, and controlled oil spraying for uncooked food.

The apparatus is heated by infrared rays making it possible to cook, without an oil bath, commercial precooked deep-frozen food, such as chips, doughnuts, pommes dauphines, etc., or fresh or uncooked food, such as chips, chestnuts, spring rolls, etc., without any drawbacks and any risks, in a hygienic and dietetic manner.

Before expanding on the technological description of the invention, it is worthwhile describing the distinctions which characterize cooking by infrared radiation compared to the conventional method of cooking by immersion in a bath of boiling oil.

When a body receives infrared rays, it absorbs them, reflects them, refracts them and scatters them. The fraction of the energy produced by the infrared radiation, received and absorbed by the body, causes heat to be produced in the material which has received this radiation. This heat absorbed by the body increases on approaching the absorptivity of this body.

This is because any substance irradiated by infrared rays absorbs a relatively large part of the energy and heats. This material is characterized by the fact that it possesses an absorptivity which is specific to it. The closer the wavelength of the infrared rays emitted is to the absorption wavelength of the material the greater and more intense will be the heating. Therefore, in order to heat a body effectively, it is necessary to irradiate it with rays having the same wavelength as the specific absorption wavelength for this body.

In order to optimise the efficiency in our application, the wavelength of the infrared rays emitted will be between two and four microns.. This wavelength has the particular feature of being the same as that emitted by the burning embers of a wood fire.

In addition, the surface temperature of the emitter will be in the region of 1000° C.

The object of the present invention is to replace the conventional means of cooking in a bath of boiling oil with a process which grills the surface, by applying the principle described in the above paragraph, the advantage of which is also to heat the air contained in the chamber, which makes it possible to cook the inside of the food by convection, as in a conventional oven.

The simultaneous combining of these two phenomena gives an end product which is of very high nutritive quality and can be produced in a very short time (less than five minutes, for example, for chips or for pommes dauphines).

The subject of the invention is therefore a domestic electrical cooking apparatus for cooking precooked, deep-frozen or fresh food, of the fryer type, with no oil bath and no preheating, having a rotary basket, heated by infrared radiation, characterized in that it comprises a body surrounding a metal chamber, a removable rotary basket mounted so as to rotate in the said chamber, an electric motor for driving the basket in rotation and a cover for closing the chamber in a sealed manner, the back of the said rotary basket being provided with a spring system for holding the rotary basket in the recumbent position, while the cover is equipped with a system for the rotary centering of the rotary basket, the open end of which interacts with the said rotary centering system on closing the cover.

BRIEF DESCRIPTION OF THE DRAWINGS

The invention will be better understood on reading the description which follows, given solely by way of example and with reference to the appended drawings, in which:

FIG. 2 is an elevation view of the rotary basket forming part of the construction of the fryer according to the invention;

FIG. 3 is an end view of the basket in FIG. 2;

FIG. 4 is a partial view on a larger scale of the means for centering the back of the basket;

FIG. 8 is an elevation view in cross-section on 8—8 in FIG. 9 of the reflector of the fryer according to the invention;

FIG. 9 is a front view of the reflector in FIG. 8;

DETAILED DESCRIPTION OF THE PREFERRED EMBODIMENTS

Figure 1:
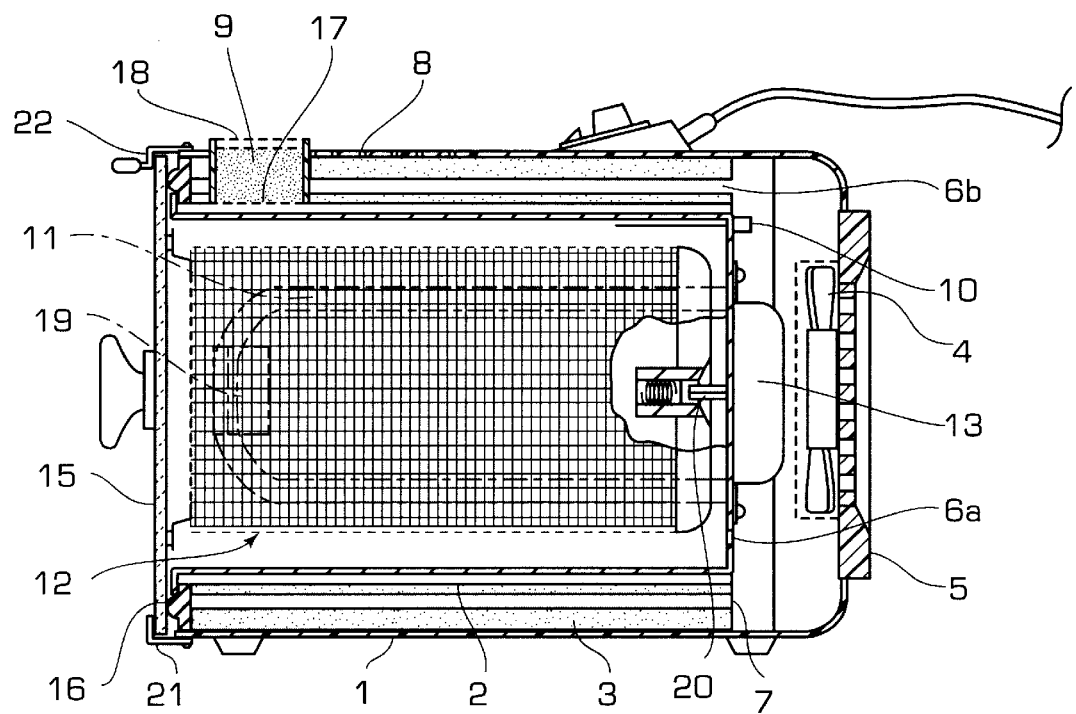
FIG. 1 is a cross-sectional elevation view of the fryer according to the invention in the working position.

The cooking apparatus consists, according to the invention (as shown in FIG. 1), of a body made of metal or moulded plastic, which surrounds a stainless steel or aluminium chamber, called the internal wall, while leaving a certain space in order to allow dissipation of the internal heat by a conventional or forced air circulation and the optional fitting of a lagging product 3. In the front part of the body, the internal wall and the outer part form flanged edges which are fastened by screws or rivets.

This fastening is covered with a preformed silicone seal 16, for example one with an "omega" profile in order to seal between the cover 15, once closed, and the cooking chamber of the fryer. The apparatus may or may not be equipped with a system for air circulation and forced extraction by means of an extra-flat fan 4 which has the effect of drawing fresh air through a moulded plastic back 5. This fresh air passes simultaneously through two series of perforations 6a and 6b, made in the back metal sheet 7, and is then expelled, on the one hand, via openings 8 made in the body in the front part of the fryer and, on the other hand, through a filter 9 made of foam filled with activated charcoal or made of steel wool. This filter is held captive in the bottom part by a mesh 17 welded to the internal wall and by an articulated or removable meshed cover 18 in the top part. The influx of external air makes it possible to fulfil five important functions. Firstly, the air part passing through the openings 6a makes it possible to circulate the ambient air inside the cooking chamber, thus ensuring good distribution of the heat. Secondly, extraction of steam and of oil vapour in suspension in the chamber, forcing them to be trapped by the filter 9. Thirdly, the air part passing through the perforations 6b and emerging via the openings 8 provides additional cooling of the lagged double wall and of the outer body 1. Fourthly, to slow down the rise in temperature inside the cooking chamber, thus retarding the action of the safety thermostat 10 which is set to approximately two hundred and fifty degrees. Fifthly, when putting the fryer in the vertical position, it considerably reduces the time to cool the apparatus before it is stowed away.

The body is provided on each side with two bakelite handles 19 fastened by screws or by rivets. The back 5 is provided with protuberances on which the apparatus rests in the vertical position. In order to hold the apparatus in the horizontal position, three plastic feet are provided. The presence of the handles, the back protuberances and the three feet is of paramount importance, as will be seen in that part of the description devoted to the principle of use of the apparatus. It represents one of the bases of the invention.

The cooking is carried out by means of silica quartz tubes 11 in the form of a "U", emitting infrared radiation whose wavelength, as indicated previously, is between two and four microns. The tubes are fastened to a mounting plate which itself is fastened by riveting to the back metal sheet of the body.

Introduced into the chamber of the apparatus is a removable rotary basket 12 consisting, according to FIG. 2, of a cylindrical body 100 made of apertured metal or meshing with fairly fine meshes, this being crimped or welded to a metal back 102 with a flanged edge conducive for cleaning. Made in the center of the back is a small pressed cone-shaped recess 109 conducive for the centering and penetration of the shaft of the drive motor. Welded behind this recess is a small spring mechanism composed of a metal socket 103a in which a compression spring 103b and a self-lubricated metal sliding guide 103c are held captive. The purpose of this small mechanism is, when the cover is closed, to maintain a force sufficient to prevent the basket from leaving a centering system on the cover 15 while it is rotating. The center of this back 102 is pierced with a square hole 104, with the same dimensions as the likewise square shaft of the electric drive motor. A wire circle 105 is welded at the front part of the body 101 of the basket, this wire circle having the purpose of eliminating any risk of injury and allowing the basket to be held in the horizontal position, being positioned in the centering guide 103 on closing the cover. The basket is equipped with at least two longitudinal spacers 106 (FIG. 3) made of metal mesh, which is bordered by welding, of a likewise metal wire or produced in the body by drawing.

These spacers have the primordial function of turning the food over during cooking, in order to expose it as much as possible to the infrared radiation. In order to extract the basket, a small commercially-available standard preformed metal sheet 107 is welded to the front part of the mesh. The handle 108 is also standard and commercially available.

Figures 5, 6, 7:
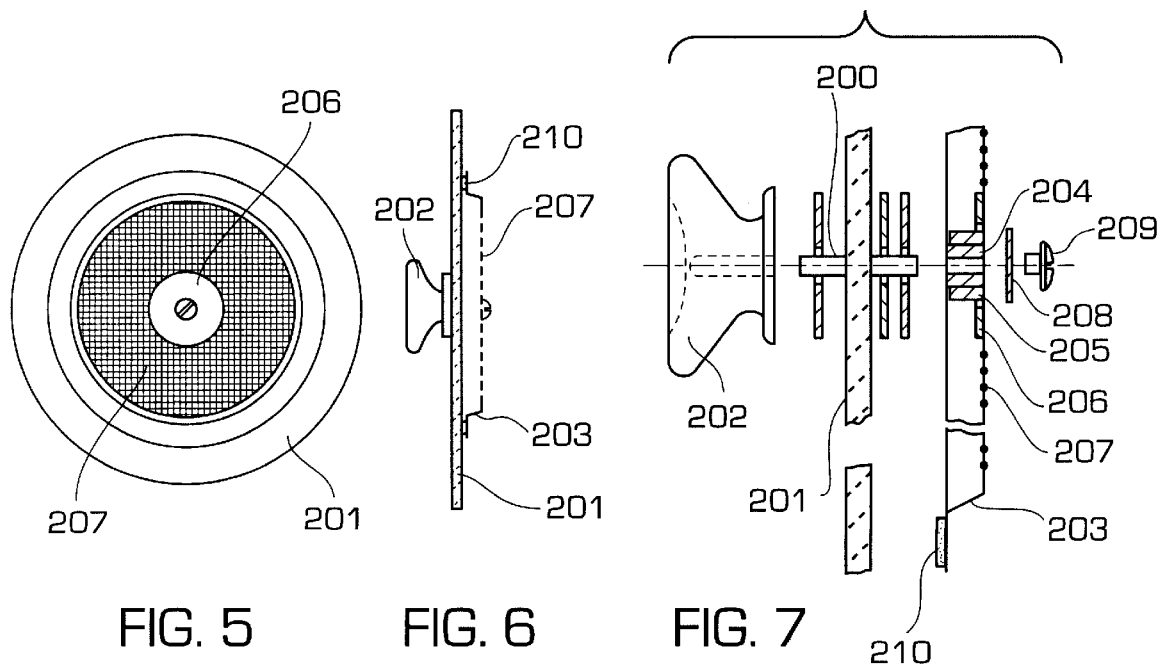
FIG. 5 is a front view of the cover of the fryer.
FIG. 6 is a cross-sectional side view of the cover in FIG. 5.
FIG. 7 is a view of the cover in FIG. 6.

The basket 12 rotates on itself about its major axis by means of a small electric motor 13 (FIG. 1) fastened at the rear of the back metal sheet of the body of the apparatus by screws or rivets. The basket is held and driven at its rear part by the square shaft 20 of the electric motor and guided on its front face by a rotary centering system fastened to the cover 15 of the fryer. As shown in FIG. 5, this cover comprises a glass disc 201 on the front of which is screwed a bakelite knob 202 serving as a handle. The internal part of the cover consists of a rotary centering system. This system is formed by a threaded metal pin 200 carrying a metal bush 204 about which rotates a shorter likewise-metal bush 205 which is welded to a large washer 206 which is itself welded to a mesh disc 207 which in turn is welded to a guide collar 203 whose face parallel to the glass disc may be equipped with PTFE pads 210, thus favouring sliding of the system during rotation. The whole assembly is held in position by a washer 208 and a stainless steel screw 209. The cover is held closed by two fixed metal retaining clamps 21 (FIG. 1) riveted or welded to the body 1 and by a closure system 22 which may be formed by a small metal tab which is performed into a "Z" and fitted at one end into a small plastic handle, thus protecting from the heat.

Provided between the inner chamber and the infrared resistance elements 11 is a removable octagonal shell 220 (FIG. 8) made of preformed metal, the inner face of which is "mirror" polished, forming a reflector and making it easy to clean the marks due to splashes of food. This shell is pierced in its top part by a rectangular hole 221 in order to allow passage of air into the filter. Welded onto the front face of the reflector is a metal ring 222 whose purpose is to guide the insertion of the basket while at the same time protecting the silica quartz resistance elements from possible shock. A turn-up, forming a rim 223, is provided at the rear of the bottom part of the shell 220. The bottom part of the reflector thus forms a dripping pan for collecting the possible condensates.

The supply of power to the resistance elements and the cooking time are controlled by a mechanical or electronic timer which cuts off the cooking upon returning to its initial position. The temperature inside the chamber is limited to approximately 250° by interposing, between the timer and the resistance elements, a thermostat 10 (FIG. 1) providing at the same time the thermal cut-out of the apparatus.

The present invention requires the principle of use of the apparatus to be broken down, with reference to FIGS. 10A–10F.

Figure 10A:
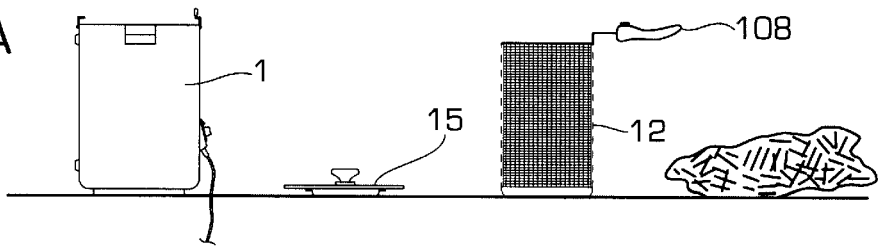
FIGS. 10A–10F are a set of diagrams showing the principle of use of the fryer according to the invention.

1) After having plugged in the fryer in the vertical position, remove the cover 15 and take out the basket 12 using the removable handle 108 (FIG. 10A).

Figure 10B:
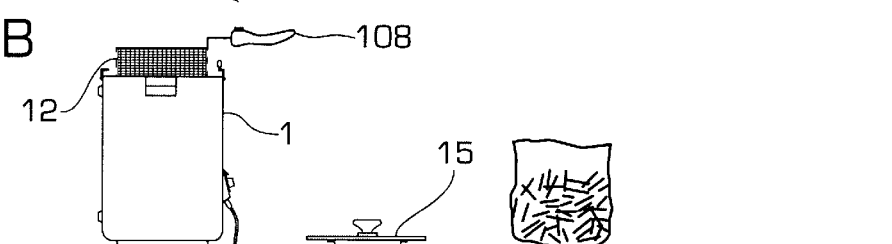

2) Pour the amount of food to be cooked into the basket and then put the basket back into the fryer, making a slight rotational movement in order to enable the square shaft of the drive motor to enter the back of the basket (FIG. 10B).

Figure 10C:
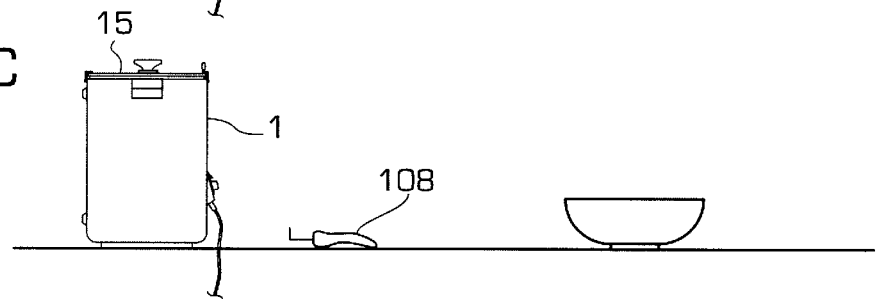

3) Put the cover 15 back on (FIG. 10C).

Figure 10D:

4) Tilt the fryer over into the horizontal position and then rotate the timer to the desired cooking time (FIG. 10D).

Figure 10E:
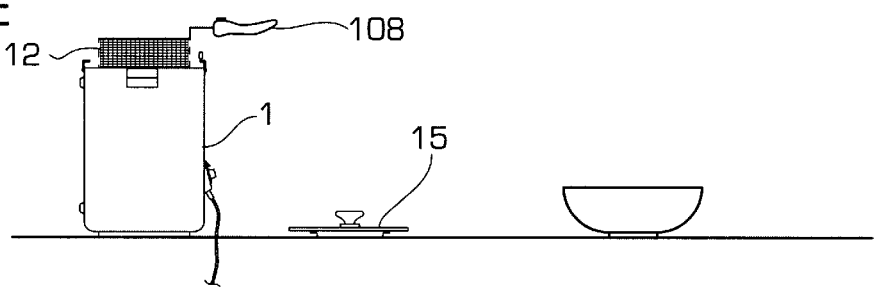

5) At the end of cooking, stand the fryer up in the vertical position, remove the cover 15 and take the basket 12 out, again using the removable handle 108 (FIG. 10E).

Figure 10F:
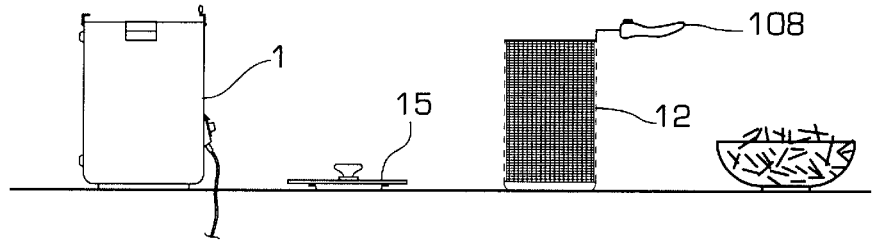

6) Pour the cooked food out into a container, and then serve (FIG. 10F).

The fact of tilting the fryer over and then standing it up when using it represents one of the characteristics of the invention.

The apparatus according to the invention is principally intended for the general public. Simply by increasing its size, and by using steels or materials termed "food grade", it may be of interest to fast-food catering professionals who are faced with the same drawbacks and the same risks as those encountered by private individuals.

By making a few modifications, the invention also makes it possible to cook grilled items such as burgers, etc.

Figure 11:
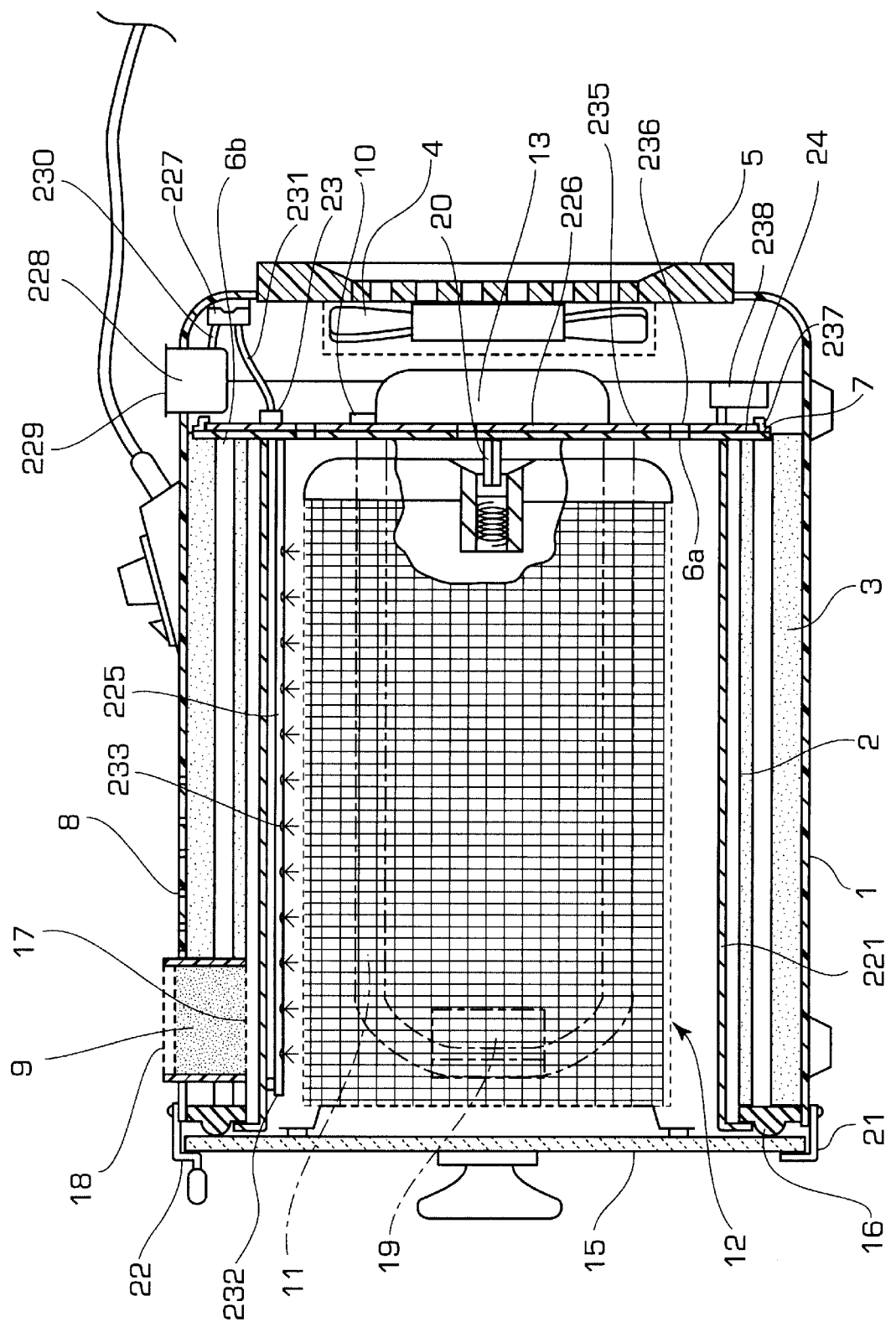
FIG. 11 is a cross-sectional elevation view similar to that in FIG. 1 of a variant of the fryer according to the invention.

FIG. 11 shows a variant of the fryer according to the invention, the parts common to those of the fryer in FIG. 1 bearing the same reference numbers.

According to this variant, in order also to allow fresh food to be cooked, an oil spray system 225 is provided, together with a mechanism 226 for closing off the internal air circuit.

The spray system 225 is composed of a small electric diaphragm pump 227 placed behind the back of the cooking chamber. It is supplied by a small plastic reservoir 228 provided with a sealed filling lid 229 placed at the top when the fryer is in the recumbent horizontal operating position. Two plastic pipes 230, 231 supply, upstream, the pump and, downstream, a spray bar 232.

The spray bar 232 consisting of a metal tube, in which a series of small equidistant holes 233 made along a generatrix, is fastened at the top of the fryer in the recumbent position by means of a washer welded to the tube and of a nut sandwiching the back of the cooking chamber. The end of the bar opposite the pipe 231 is closed off. The holes 233 are turned towards the bottom of the fryer.

The closure mechanism 226 is composed of a rotary perforated metal ring 235, pierced with openings 236 of the same dimensions as the openings 6a in the back of the cooking chamber. This rotary ring is placed just behind this back and is guided by a circular ring 237 having a "Z" profile, welded to the back of the chamber. A slight clearance remains in order to allow the ring 235 to rotate freely. This ring is actuated by a small electro-magnet 238 placed near the back of the chamber. When the latter is at rest, the openings 6a and 236 are facing each other and the circulation and expulsion air passes through.

Figure 12:
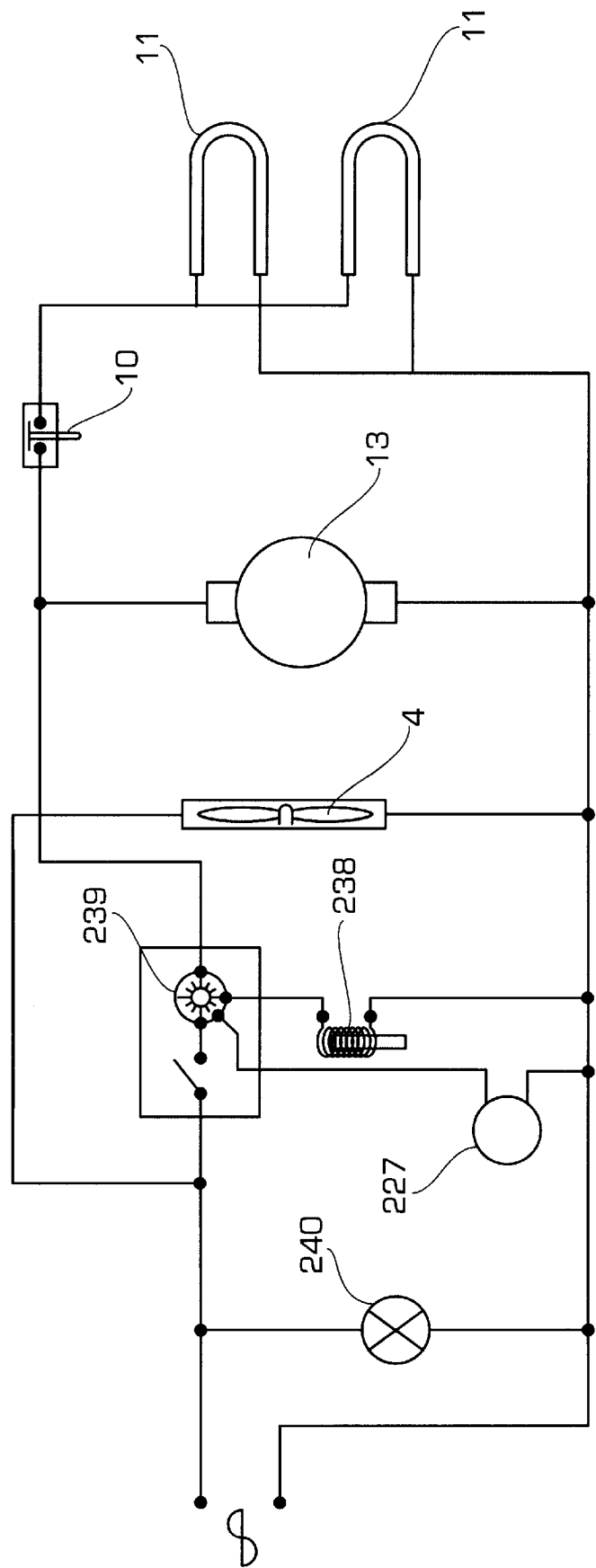
FIG. 12 is an electric circuit diagram of the fryer represented in FIG. 11.

FIG. 12 shows the electrical circuit diagram of the fryer in FIG. 11.

This figure shows the electrical resistance elements 11 supplied via the timer 239 and the thermostat 10 from the mains.

The electric motor 13 for driving the basket 12 in rotation is connected in parallel to the thermostat 10 and the resistance elements 11.

The fan 4 is supplied directly from the mains.

The diaphragm pump 227 and the electromagnet 238 for controlling the ring 235 for closing off the openings 6a in the back of the fryer are themselves supplied from the mains via the timer 239 during portions of the cooking time which correspond respectively to maintaining in the fryer an amount of steam necessary for cooking the food and for a frying operation.

Finally, a power-on indicator lamp 240 is connected to the input of the circuit.

The cooking operation consists, during a first phase, in setting the timer 239 to a position corresponding to the cooking of "UNCOOKED PRODUCTS", having the effect of cutting off the air part passing through the cooking chamber and of precooking the food using its own moisture. After a certain time, when the products are almost cooked but still sufficiently rigid not to break up (especially chips), the timer 239 actuates, on the one hand, the electromagnet 238 which controls the entry of circulation air and makes it possible to expel the moisture accumulated in the cooking chamber and on the other hand, the small electric diaphragm pump 227 which delivers from the oil reserve 228 a small amount of fat into the spray bar 232. The food products are in this way coated with a thin film of fat which is distributed uniformly due to the effect of the air circulation. The purpose of this second phase is to transform the food with a boiled appearance into fried and crunchy products.

I claim:

1. Domestic electrical cooking apparatus for cooking precooked, deep-frozen or fresh food, of the fryer type, with no oil bath and no preheating, having a body surrounding a metal chamber (2), a removable rotary basket (12) heated by infrared radiation mounted so as to rotate in the said chamber, an electric motor (13) for driving the basket in rotation and a cover (15) for closing the chamber in a sealed manner, the base of the said rotary basket being provided with a spring system (103a, 103b, 103c) for holding the rotary basket (12) in recumbent position, while the cover (15) is equipped with a system (203, 204, 205, 206, 207) for the rotary centering of the rotary basket (12), an open end of which interacts with the said rotary centering system on closing the cover (15). said apparatus further comprising, at an end of the chamber opposite the cover, a double row of perforations (6a, 6b) forming part of a double path (6a, 221, 9, 18; 6b, 8) for circulation of air, respectively inside the chamber of the apparatus and in the space between the body and the metal chamber (2), due to the effect of a fan (4).

2. Cooking apparatus according to claim 1, characterized in that the body includes protuberances for holding the apparatus in vertical position for fitting the rotary basket into the body and for removing it therefrom, and feet for holding the apparatus in horizontal operating position.

3. Cooking apparatus according to claim 1, characterized in that the spring system for holding the rotary basket (12) in the recumbent position includes, in the center of the back of the rotary basket (12), a conical recess (109) for centering the shaft of the motor (13) for driving the rotary basket, a metal socket (103a) which holds a compression spring (103b) and a self-lubricated sliding guide (103c) captive, the metal socket (103a) being fastened by welding opposite a hole (104) made in the back (102) of the basket in the center of the conical recess (109), the hole (104) having a square shape complementary to that of the output shaft of the drive motor (13).

4. Cooking apparatus according to claim 1, characterized in that the system for the rotary centering of the basket (12) with respect to the cover (15) includes, mounted on a disc (201) provided with a knob (202) forming a handle, a guide collar (203) which is intended to interact with a circle (105) welded to the open end of the basket and which is mounted so as to rotate with respect to the disc (201) by means of a metal bush (205) carried by a metal pin and held fast to the collar (203) by a mesh disc (207) which is welded to the guide collar (203) and connected to the bush by a washer (206) which is itself welded to the mesh disc (207).

5. Cooking apparatus according to claim 4, characterized in that the guide collar (203) is a metal collar having a part opposite the disc (201) which is equipped with pads (210), an intermediate part which is conical and a flange opposite the disc (201) and welded to the mesh disc (207).

6. Cooking apparatus according to claim 3, characterized in that the removable rotary basket (12) consists of a cylindrical body (100) made of apertured metal or mesh, fastened to a pressed metal back (102) at the center of which the said conical recess (109) is made, this recess favouring penetration of the shaft of the drive motor (13), the open end of the body including the wire circle (105) welded for holding and centering the basket in the horizontal position.

7. Cooking apparatus according to claim 1, characterized in that the rotary basket (12) includes at least two members (106) for turning over the food during cooking, while the rotary basket (12) is rotating, the said turning-over members being produced from metal mesh and bordered on their periphery by a welded wire.

8. Cooking apparatus according to claim 1, characterized in that the heating is obtained by means of radiation sources (11) emitting radiation with a wavelength of a few microns.

9. Cooking apparatus according to claim 8, characterized in that the radiation sources are silica quartz tubes produced in the form of a "U" and having a wavelength of between two and four microns.

10. Cooking apparatus according to claim 8, characterized in that it furthermore includes a removable reflector (14) inserted between the radiation sources (11) and the metal chamber (2) of the apparatus.

11. Cooking apparatus according to claim 1, characterized in that the double air circulation path comprises a first path which includes first perforations (6a) in the back of the chamber (2), the inside of the said chamber and a filter (9) which is mounted between the metal chamber (2) and the side wall of the body of the apparatus, and a second path which includes second perforations (6b), the space between the metal chamber (2) and this body (1) of the apparatus and an opening (8) made in the body.

12. Cooking apparatus according to claim 10, characterized in that the removable reflector (14) is formed by a hexagonal or octagonal metal shell (220) whose internal face, on the side facing the rotary basket (12), is polished like a mirror, the said reflector being provided with a welded metal ring (222) and in that, at its end opposite the said ring, the shell (220) includes a turn-up forming a rim, the wall of the shell provided with the said rim (223) constituting a dripping pan.

13. Cooking apparatus according to claim 10, characterized in that the said reflector (14) includes a hole (221) located opposite the filter (9) forming part of a first air circulation path (6a, 221, 9, 18).

14. Cooking apparatus according to claim 2, characterized in that it furthermore includes an oil spray system (225) controlled by a timer (239) of the apparatus and including a spray bar (232) housed in the top of the apparatus when the latter is in the horizontal operating position, the said bar (292) being supplied via a diaphragm pump (227) from an oil reservoir (228) which has a sealed lid (229) placed in the top of the apparatus when it is in the horizontal position.

15. Cooking apparatus according to claim 13, characterized in that it furthermore includes a mechanism (226) for closing off the first air circulation path (6a, 221, 9, 18), this mechanism comprising a rotary ring (235) which is pierced by openings (226) of the same dimensions as the first perforations (6a) in the back of the chamber and is actuated by an electromagnet (238) under the control of the timer (239) of the apparatus.

* * * * *